United States Patent [19]

Wierschem

[11] Patent Number: 4,786,076
[45] Date of Patent: Nov. 22, 1988

[54] STEERING COLUMN FASTENING ARRANGEMENT FOR A MOTOR VEHICLE

[75] Inventor: Franz-Rudolf Wierschem, Weissach, Fed. Rep. of Germany

[73] Assignee: Dr. Ing. h.c.F. Porsche Aktiengesellschaft, Stuttgart, Fed. Rep. of Germany

[21] Appl. No.: 49,468

[22] Filed: May 14, 1987

[30] Foreign Application Priority Data

May 14, 1986 [DE] Fed. Rep. of Germany ....... 3616246

[51] Int. Cl.$^4$ .............................................. B62D 1/18
[52] U.S. Cl. ..................................... 280/777; 74/492; 188/376
[58] Field of Search ......................... 280/777; 74/492; 188/371, 376, 377

[56] References Cited

U.S. PATENT DOCUMENTS 4,194,411 3/1980 Manabe et al. ..................... 188/376

FOREIGN PATENT DOCUMENTS 2225128 9/1978 Fed. Rep. of Germany ........ 74/492

Primary Examiner—John J. Love
Assistant Examiner—Karin Ferriter
Attorney, Agent, or Firm—Barnes & Thornburg

[57] ABSTRACT

A steering column fastening arrangement for motor vehicles with an energy-absorbing deformation element which is arranged between a steering bracket retained fixed at the body and a tubular protective steering member. The deformation element consists of a metallic plate rigidly connected with a U-shaped member of the tubular protective steering member while the plate includes slot-like deformation sections that are arranged corresponding with elongated apertures of the U-shaped member. The tubular protective steering member is retained displaceable in case of a crash with respect to the steering bracket by way of the displacement bolts extending through the deformation sections and guided in the elongated apertures and, on the other hand, the tubular protective steering member is fixedly connected with the steering bracket. The plate of the deformation element consists of a plastically deformable metallic material and has a thickness, width and length of the deformation sections matched in a defined manner to the requisite deformation behavior.

7 Claims, 2 Drawing Sheets

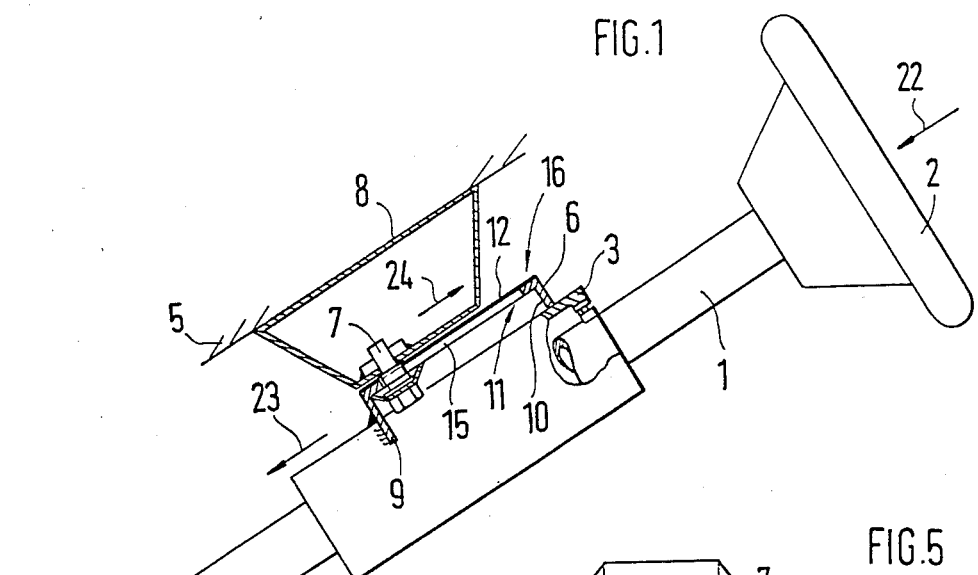
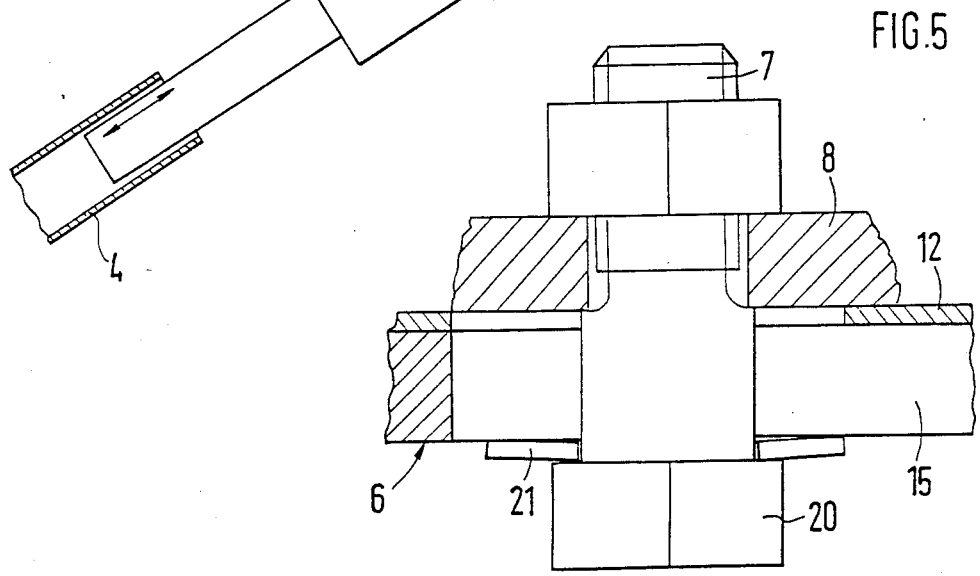
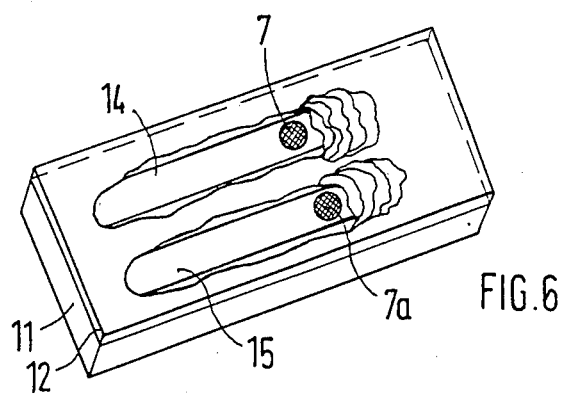

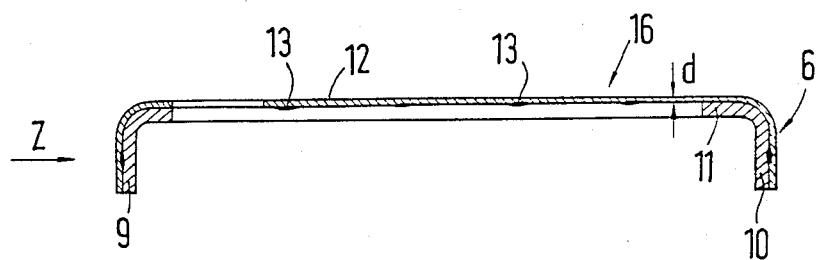
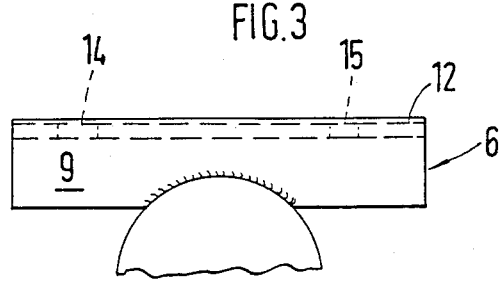
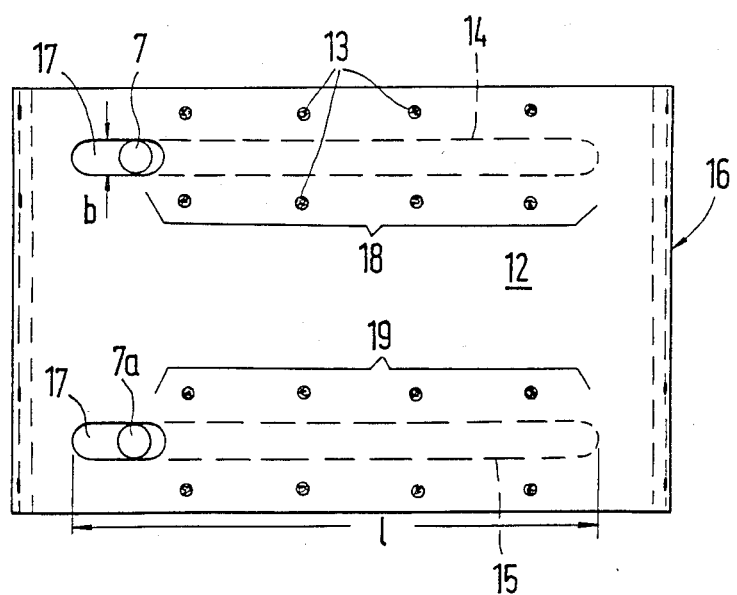

4,786,076

STEERING COLUMN FASTENING ARRANGEMENT FOR A MOTOR VEHICLE

BACKGROUND AND SUMMARY OF THE INVENTION

The present invention relates to a steering column fastening arrangement for a motor vehicle with an energy-absorbing deformation element which is arranged between a steering bracket retained on the side of the body and a tubular protective steering member.

A steering column fastening arrangement is disclosed already in the DE-OS No. 28 14 145 which includes an arrangement for the energy absorption in case of collisions by way of a deformation element. This deformation element is connected with the steering column and includes zigzag-shaped deformation sections. A plastic deformation of the element takes place in case of an impact by way of a retaining member on the side of the body which cooperates with the deformation element by means of a bolt. However, this prior art arrangement consists of a large number of individual components which are costly to install and which does not assure a safe mounting of the steering column at the vehicle body by way of these elements.

It is the object of the present invention to provide a steering column fastening arrangement including a deformation element which with a simple construction consists of few individual parts to be non-costly in manufacture and which assures a safe and reliable fastening of the steering column at the vehicle body.

The underlying problems are solved according to the present invention in that the deformation element consists of a plate rigidly connected with a U-shaped member of the tubular protective steering member, which includes slot-like deformation sections that are arranged corresponding to elongated apertures of the U-shaped member, in which are guided displacement bolts extending through the deformation sections that retain the tubular protective steering member at the steering bracket fixed at the body.

In the steering column fastening arrangemet according to the present invention, the same only needs to be constructed as deformation member whereby the plate-shaped construction thereof offers the advantage of a small structural space. Therebeyond, the deformation member is formed of few parts which are assembled on the outside and can then be installed in the vehicle in a simple manner.

Owing to the deformation element with slot-like deformation sections which consists in a suitable manner of a relatively thin metallic plate, this element can absorb a sufficient deformation path without significant stress concentration and the element will effect a stepwise progressive energy absorption as a result of a collision.

By the additional arrangement of a cup spring between the head of the displacement bolt and the U-shaped member, the axial fixing force of the bolt is defined and the deformation path is correspondingly influenced.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 1 is a side elevational view, partly in cross section, of a steering arrangement with a deformation element in accordance with the present invention;

FIG. 2 is a cross-sectional view, on an enlarged scale, through the plate-like deformation element in accordance with the present invention, connected with a U-shaped member;

FIG. 3 is an elevational view in the direction of arrow Z of FIG. 2;

FIG. 4 is a plan view on FIG. 2;

FIG. 5 is a cross-sectional view, on an enlarged scale, of the displacement bolt with cup spring in accordance with the present invention; and FIG. 6 is a perspective view of a plastically deformed plate of the element after a collision

DETAILED DESCRIPTION OF THE DRAWINGS

Referring now to the drawing wherein like reference numerals are used throughout the various views to designate like parts, the steering arrangement illustrated in FIG. 1 includes a steering shaft 1 which is connected at its upper end with a steering wheel 2 and at its lower end with a steering gear (not shown) and which is rotatable within a tubular protective steering member 3. The steering shaft 1 is retained in the longitudinal direction relative to a displaceable part 4. The fastening of the steering arrangement at the vehicle body 5 takes place by way of a U-shaped member 6 connected with the tubular protective steering member 3, whereby the member 6 is retained at a steering bracket 8 by means of displacement bolts 7, 7a.

The member 6 consists of a U-shaped profile whose legs 9 and 10 are rigidly connected with the tubular protective steering member 3 by a welded connection. A relatively thin metallic plate 12 forming a deformation element 16 is arranged on the web 11 of the member 6 which is secured at the member 6 by spot-welding 13.

The U-shaped member 6 includes two elongated apertures 14 and 15 extending in the axial direction of the steering shaft 1 which are preferably arranged parallel to one another. These elongated apertures 14 and 15 are covered off on top by the plate 12. The displacement bolts 7 and 7a extend through the elongated openings 17 arranged in the plate 12 and through the elongated apertures 14 and 15 arranged therebelow and are secured by nuts at the steering bracket 8 under support at an inner surface of the U-shaped member 6. For purposes of a variable adjustment of the friction, the bolt 7, 7a includes a cup spring 21 (FIG. 5) between its head 20 and the web 11 of the member 6. The areas of the plate 12 of the deformation element 16 arranged correspondingly with the elongated apertures 14 and 15 form slot-like deformation sections 18 and 19.

If the steering shaft 1 is exposed to a force directed in FIG. 1 in the direction of arrow 22, the U-shaped member 6 together with the tubular protective steering member 3 moves in the direction of arrow 23. The material of the plate 12 secured on the U-shaped member 6 is split open within the area of the elongated apertures 14 and 15 by way of the displacement bolts 7 and 7a along the lateral boundaries of the elongated apertures 14 and 15 and is plastically deformed in the direction of arrow 24, as shown more fully in FIG. 6.

The illustrated deformation element 16 can also be constructed in such a manner that more than two displacement bolts 7 and 7a are used. It is also feasible that several bolts are provided which are arranged offset to one another in the longitudinal direction. The plate 12 could also have a different thickness over its length for purposes of achieving a differing deformation behavior, respectively, different materials could also be used.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A steering column fastening arrangement for a motor vehicle, comprising an energy-absorbing deformation means which is arranged between a steering bracket retained at a relatively fixed vehicle part and a tubular protective steering member, the deformation means including an approximately U-shaped member secured to the tubular protective steering member and a plate securely connected with the U-shaped member, said plate being provided with slot-like deformation sections which are arranged to cover corresponding elongated apertures in the U-shaped member, displacement bolt means guided in said apertures and extending through openings in the deformation sections, and said displacement bolt means retaining the tubular protective steering member at the steering bracket and causing tearing of said deformation sections of said plate for energy absorbing purposes.

2. A steering column fastening arrangement according to claim 1, wherein the plate is arranged on a web between arms of the U-shaped member and facing the steering bracket and the deformation sections which extend in the axial direction of the steering shaft including each an elongated aperture for the displacement bolt means which are provided at an end of the U-shaped member opposite the steering wheel.

3. A steering column fastening arrangement according to claim 2, wherein the plate consists of a metallic material and has a thickness, width and length of the deformation sections matched in a defined manner to the deformation behavior.

4. A steering column fastening arrangement according to claim 3, wherein the displacement bolt means include a cup spring between the web of the U-shaped member and a respective bolt head.

5. A steering column fastening arrangement according to claim 1, wherein the plate consists of a metallic material and has a thickness, width and length of the deformation sections matched in a defined manner to the deformation behavior.

6. A steering column fastening arrangement according to claim 1, wherein the displacement bolt means include a cup spring between the web of the U-shaped member and a respective bolt head.

7. A steering column fastening arrangement according to claim 6, wherein the plate consists of a metallic material and has a thickness, width and length of the deformation sections matched in a defined manner to the deformation behavior.

* * * * *